UNITED STATES PATENT OFFICE.

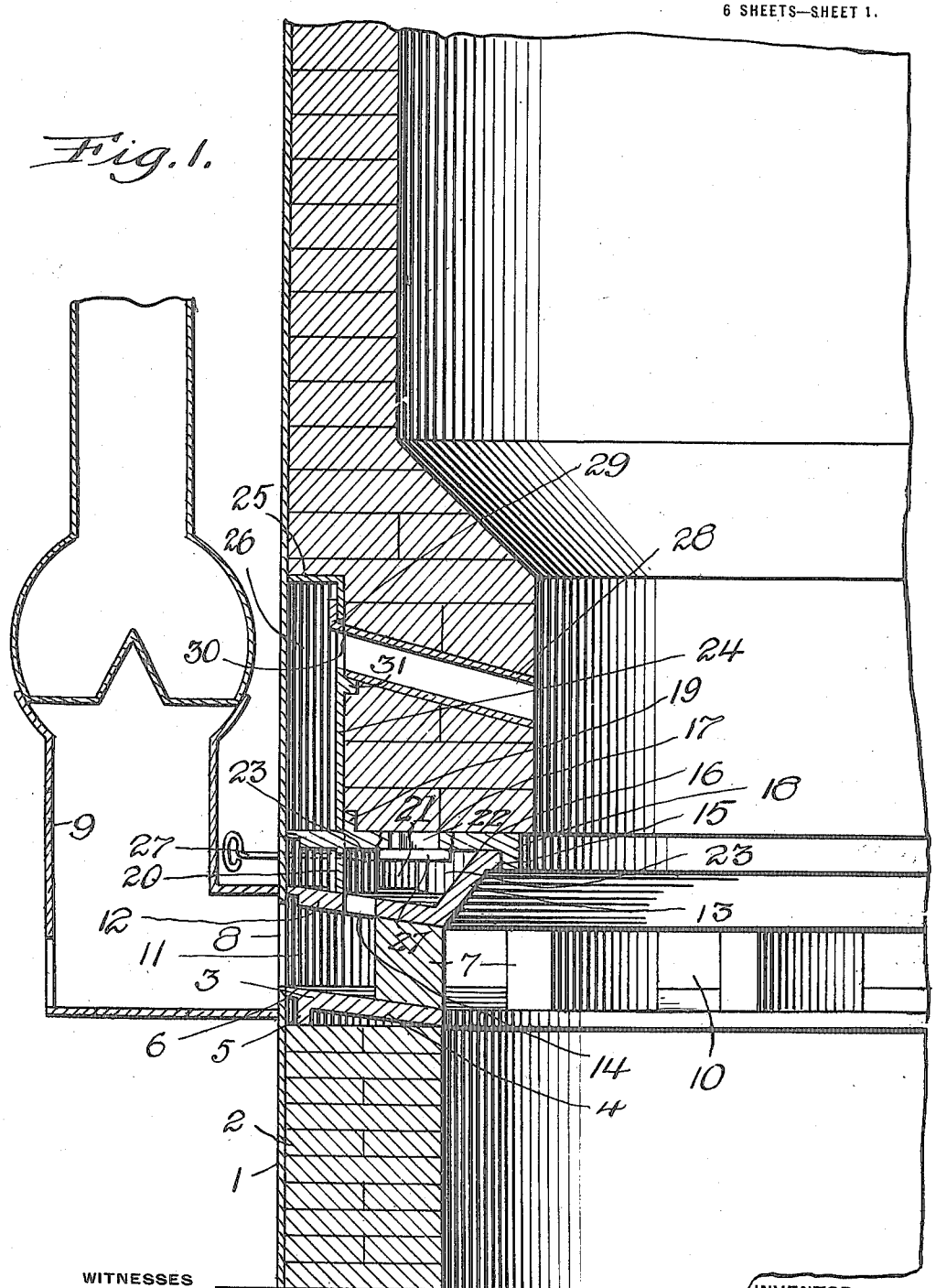

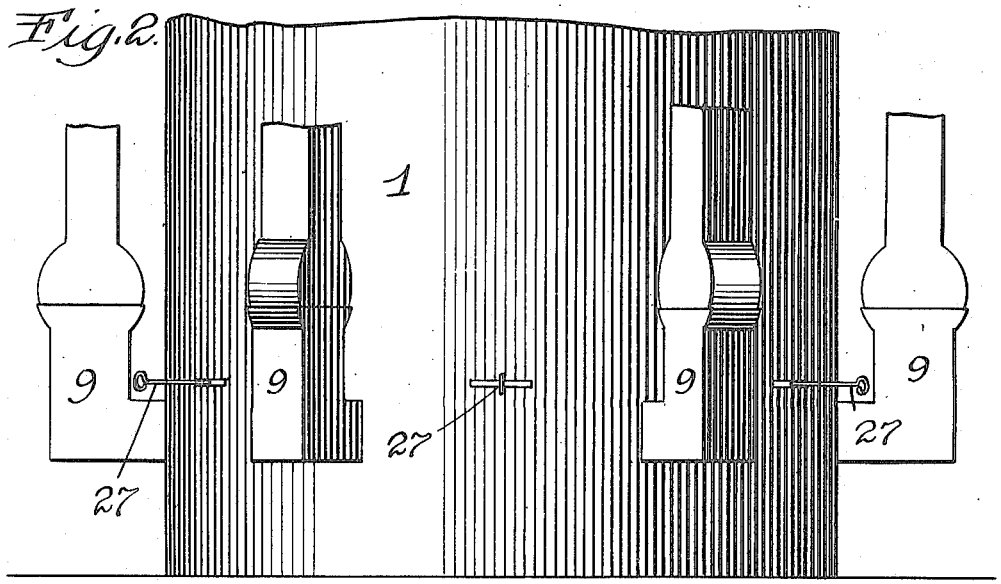
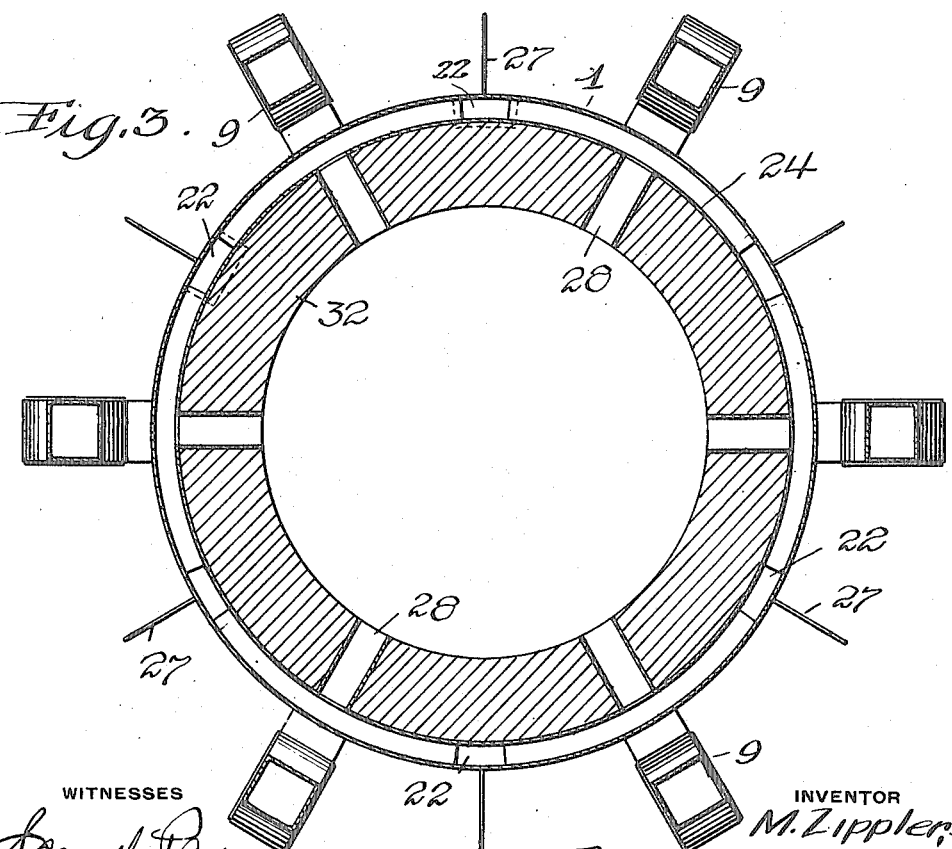

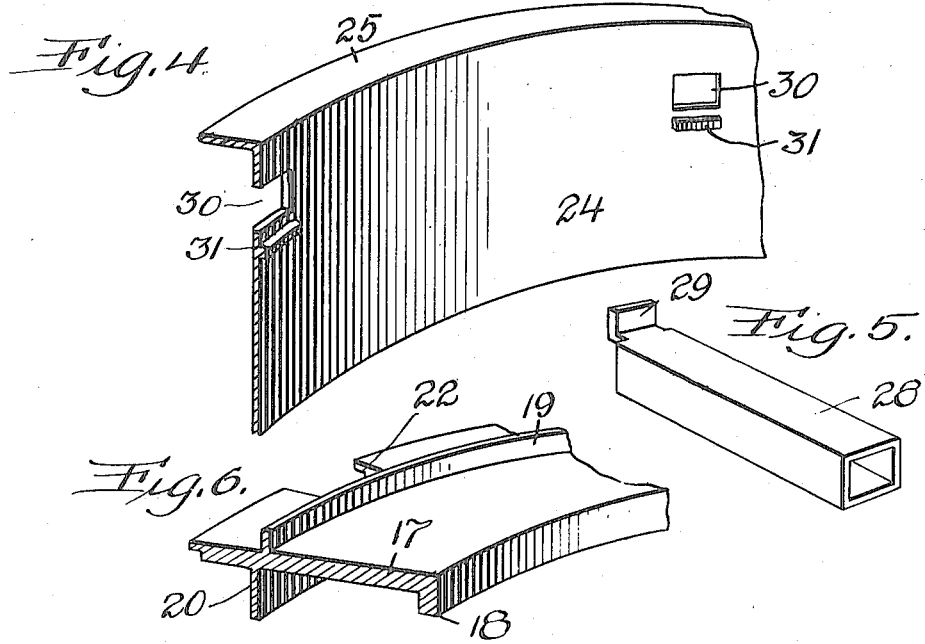
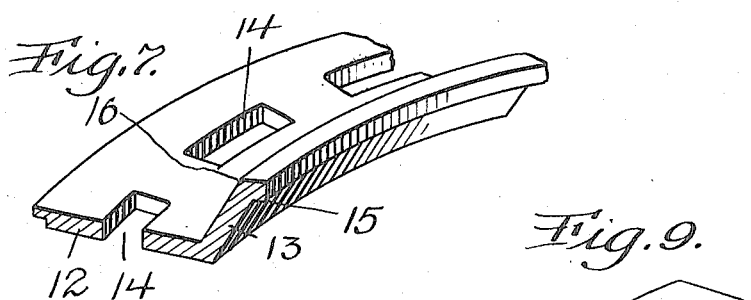
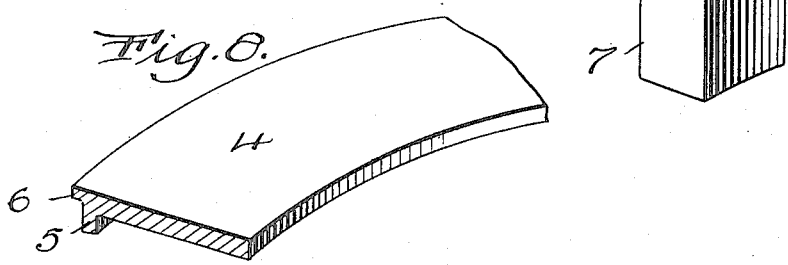

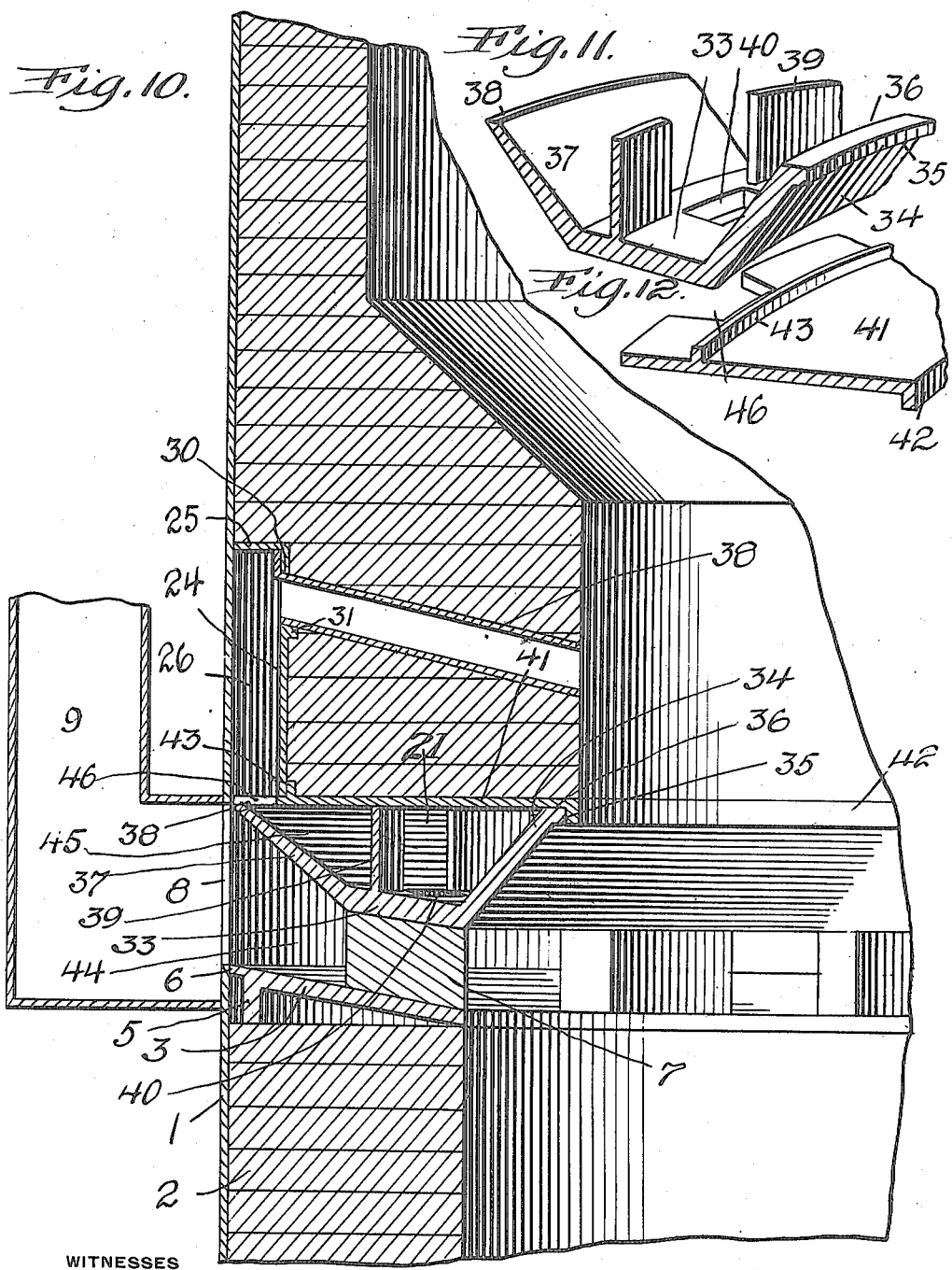

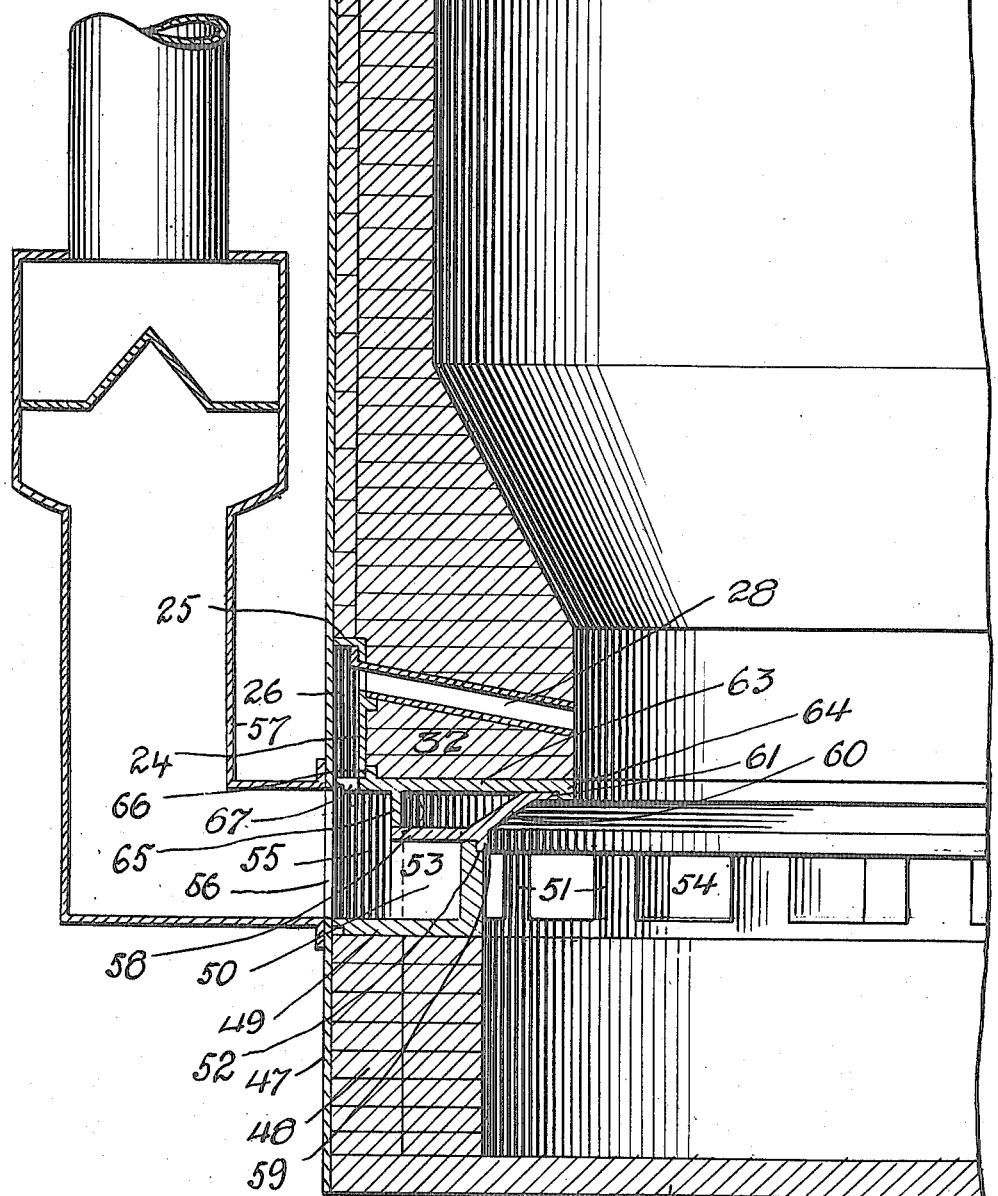

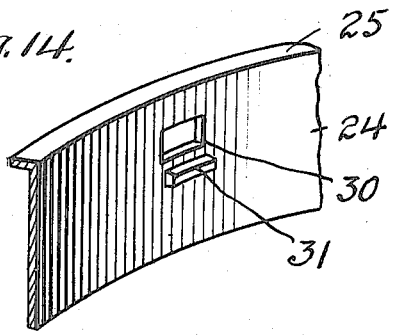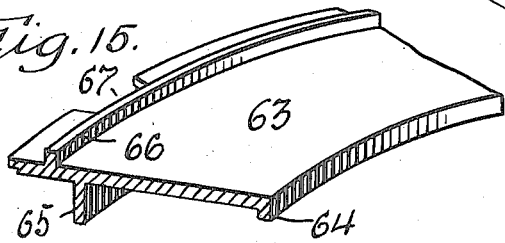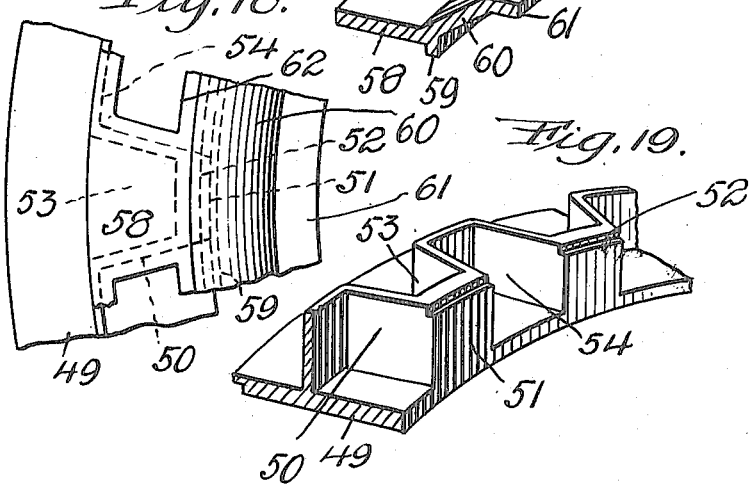

MICHAEL ZIPPLER, JR., OF PITTSBURGH, PENNSYLVANIA.

CUPOLA-FURNACE.

1,145,648.  Specification of Letters Patent.  Patented July 6, 1915.

Application filed December 11, 1913. Serial No. 806,057.

*To all whom it may concern:*

Be it known that I, MICHAEL ZIPPLER, Jr., a citizen of the United States of America, residing at Pittsburgh, in the county of Allegheny and State of Pennsylvania, have invented certain new and useful Improvements in Cupola-Furnaces, of which the following is a specification, reference being had therein to the accompanying drawing.

This invention relates to cupola furnaces, and has for its object to provide a furnace of such class, with means in a manner as hereinafter set forth, for utilizing air within the cooling agent for the bosh plate as the air is supplied to the twyers of the furnace to facilitate combustion.

A further object of the invention is to provide a cupola furnace, in a manner as hereinafter set forth with means for supplying sufficient air to the twyers to expeditiously melt iron to produce a clean product with less fuel, the twyers being constructed whereby the air is equally distributed around the furnace.

A further object of the invention is to provide a furnace of the class referred to with air cooled bosh and twyer plates, the bosh plate associating with the twyer plate and constituting the top of the latter.

A further object of the invention is to provide a cupola furnace embodying an air cooled bosh plate, an upper and a lower twyer, the supply of air to the upper twyer being had from the hollow bosh and to further provide means for controlling the supply of air to the upper twyer.

A further object of the invention resides in the novel construction of lower twyer, upper twyer and bosh that are applicable to large and small furnaces.

Further objects of the invention are to provide a cupola furnace, which is comparatively simple in its construction and arrangement, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings, wherein like reference characters denote corresponding parts throughout the several views:—Figure 1 is a vertical sectional view of a portion of a cupola furnace in accordance with this invention, Fig. 2 is a side elevation of the lower portion of a cupola furnace in accordance with this invention, Fig. 3 is a sectional plan, Figs. 4 and 5 are perspective views of the elements forming a part of the upper twyers, Figs. 6 and 7 are perspective views of the members forming the hollow bosh plate, Figs. 8 and 9 are perspective views of elements forming the lower twyers, Fig. 10 is a vertical sectional view of a portion of a modified form of cupola furnace in accordance with this invention, Figs. 11 and 12 are perspective views, broken away of the member forming the hollow bosh plate, Fig. 13 is a vertical sectional view of a portion of modified form of cupola furnace in accordance with this invention, Figs. 14 to 19 both inclusive are perspective views of elements employed in connection with the construction shown in Fig. 13.

In describing the invention in connection with the drawings referred to, I desire to point out that the views of the drawings are simply illustrative of an example whereby my invention can be placed into practice. Under such conditions, I do not limit the claims to the specific construction and arrangements of elements as illustrated and described.

The description herein to follow is to be construed broadly as including substitute arrangements and constructions which are the obvious equivalent of those illustrated.

Referring to Figs. 1 to 9 of the drawings, 1 denotes a cylindrical furnace shell having the lower portion thereof lined as at 2 with non-fusible bricks or other suitable material. The inner lining 2 not only protects the shell 1, but serves as a support for the elements of the lower twyer. The lower twyer is formed from an annular bottom plate 3 formed of a plurality of segment-shaped sections 4 and each of said sections has depending from its lower face in proximity to its outer edge, a rib 5 which is mounted upon the top of the lining 2. The ribs 5 register with each other whereby the bottom plate 3 is disposed at an inclination. The bottom 3 at its inner end rests upon the lining 2 and the said inner edge of said bottom plate 3 is flush with the inner face of said lining 2. The rear portion of each of the sections 4 is reduced as at 6 to provide clearances for bolts which may be secured to the shell 1. Mounted upon the bottom plate 3 is a series of blocks 7, which conform in contour with the shaft of the section 4, and each of which has its inner face flush with the inner edge of the plate 3. The plate 3 abuts against the shell 1 and the latter is provided with a series of openings 8 for supplying air from the wind box 9 to the lower twyer. A wind box 9 communicates with each opening 8. The spacing of the block 7 provide twyer openings 10 and each of said blocks 7 is of a width less than the width of the bottom plate 3. Mounted upon the block 7 is a sectional hollow bosh element to be presently referred to and the bottom of said element in connection with the shell 1, block 7 and casing 1 form an annular air chamber 11, into which air is supplied from the wind boxes 9 and from which air is discharged through the openings 10 into the furnace. By this arrangement, the lower twyer is air cooled.

The bosh element consists of a bottom plate including a base portion 12 and an upwardly and inwardly inclined inner portion 13 which constitutes a lining which overhangs the twyer openings 10. The bottom plate of the bosh element is formed of a series of segment-shaped sections which abut thereby setting up an annular bottom plate and the latter has the base portion 12 formed with spaced rectangular openings 14. The base portion 12 of the bottom plate of the bosh element is mounted upon the blocks 7 and the inner edge thereof is flush with the inner faces of the block 7. The inclined portion 13 of the bottom plate of the bosh element is offset as at 15, the latter in vertical section being squared as at 16. When the bottom plate of the bosh element is mounted upon the block 7, it is disposed at an inclination and is parallel to the bottom plate 3 of the lower twyer. The tops of the blocks 7 are shaped so as to support the bottom plate of the bosh element at an inclination.

The bosh element further includes a top plate which is indicated by the reference character 17 and formed of a series of segment-shaped sections, which abut, thereby setting up an annular top plate. The inner edge of the top plate 17 is formed with a depending flange 18 which abuts against the offset 15 as clearly illustrated in Fig. 1 and the said bottom plate is mounted upon a flat seat 19, formed at the top of the inclined portion 13 of the bottom plate of the bosh element. The top plate 17 in proximity to its rear edge is formed with a vertically disposed annular rib 19 and said plate 17 has depending from its lower face a supporting member 20, the latter being cut away at 21 to provide a series of outlets. The top plate 17 is disposed horizontally and is not only supported upon the seat 19, but it is furthermore supported through the medium of the element 20, which is mounted upon the base 12 of the bottom plate of the bosh element, the said element 20 being positioned rearwardly of the opening 14. The plate 17 at the rear thereof is cut away to provide a series of outlets 22 for a purpose to be presently referred to. The top and bottom plates of the bosh elements extend to the shell 1 and the said plates in connection with said shell 1 provide a chamber 23, under such conditions a hollow air cooled bosh element is set up. The air for cooling the said bosh element being supplied through the openings 14 from the chamber 11.

Mounted upon the top plate 17 and positioned against the rib 19, is a vertically disposed annular member 24, which in connection with the casing 1, provides an annular air chamber 26. The member 24 is formed of a series of abutting segment-shaped sections and each of said sections, at its top is formed with a rearwardly extending flange 25, which abuts against the casing 1. The air is supplied through the outlets 22 and the plates 17 to the chamber 26. The outlets 22 are controlled through the medium of dampers 27, which are arranged between the wind boxes 9.

The air chamber 26 is utilized for supplying air to the upper twyers and each of the latter consists of a downwardly inclined hollow casing 28, open at each end and rectangular in cross section. The top wall of the casing 28, at the rear end thereof, is formed with an L-shaped lug 29 adapted to extend through an opening 30 in the member 24, whereby the casing 28 is connected to said member 24. The rear ends of the casings 28 are supported upon lugs 31 formed integral with the outer face of a member 24, directly below the openings 30. The casings 28 are also supported upon a non-fusible lining 32 which is mounted upon the top plate 17. The lining 32 projects above and surrounds the casings 28.

In the form illustrated in Figs. 10 to 12 both inclusive, the construction of the furnace is the same as that shown in Fig. 1, with this exception that dampers are not employed and that the hollow bosh element is different. The elements in Figs. 10 to 12 which are similar to certain of the elements in Figs. 1 to 9 are designated by reference characters corresponding to those employed on Figs. 1 to 9 for such elements. As before stated the difference between the form shown in Figs. 10 to 12 and the form shown in Figs. 1 to 9 reside solely in the bosh element and the said element will now be described. The bosh element consists of a bottom plate and formed of a base 33 having projecting from its inner edge an upwardly and inwardly inclined side plate 34 provided at its top with an offset 35 and a flat seat 36. Projecting from the outer edge of the base 33 is an upwardly and outwardly inclined outer plate 37 having a flat seat 38. The seat 38 is in alinement with the seat 36. The base 33 is formed with a series of upwardly extending spaced supports 39 and further provided with rectangular openings 40. The supports 39 are arranged rearwardly with respect to the openings 40. The bottom plate is annular in contour and formed of a series of segment-shaped sections. The top plate of the bosh element is indicated by the reference character 41 and which at its inner edge is formed with a depending flange 42, which abuts against the offset 35. The top plate 41 is mounted upon the sides 36, 38, as well as the supports 39, and has its upper face, near its rear end provided with a rib 43 against which abuts the annular member 24. The top plate 41 is annular in contour and formed of a series of segment-shaped sections which abut against each other. The outer plate 37, as well as the top plate 41 extends to the shell 1. The bottom plate of the bosh element forms in connection with the blocks 7, plate 3 and casing or shell 1, an annular air chamber 44, and air from said chamber 44 is supplied to the chamber 45, formed by the top and bottom plates of the bosh element through the openings 40. Air is discharged from the bosh element into the chamber 26, through the outlets 46, formed in the top plate 41 and at the rear thereof.

Referring to Figs. 13 to 19 of the drawings, 47 denotes a furnace shell or casing having the lower portion thereof lined with non-fusible brick or other suitable material as at 48. The lining 48 constitutes a support for the lower twyer. The lower twyer consists of a flat annular plate 49 formed of a series of segment-shaped sections which abut against each other and each of the sections has formed integral with its upper face a corrugated member 50, the corrugations being V-shaped and oppositely disposed with respect to each other and each corrugation being of a length equal one-half the width of the plate 49. The crest of the corrugations which point outwardly and which is indicated by the reference character 51 is flush with the inner edge of the plate 49 and that face of the crest 51 which is flush with the inner edge of the plate 49 is provided at the top thereof with a shoulder 52. The corrugated member of one section abuts against the corrugated members of adjacent sections and the said member 50 provides pockets 53, 54, the latter being oppositely disposed with respect to the former and opening into the furnace. The plate 49 extends to the shell 47 and the corrugated member 50 has mounted thereon the bosh element, the latter in connection with the plate 49 and shell 47 forming an annular air chamber 55 with which communicates, through openings 56, wind boxes 57. The mouth of the pockets 54 constitutes what may be termed twyer openings.

The bosh elements comprise an annular bottom plate 58 formed of a series of segment-shaped sections, which abut against each other, and each section is provided at its inner edge, with a depending flange 59, and an upwardly and inwardly extending inclined inner side plate 60, the latter terminating in a laterally projecting flat flange 61. The plate 58 is mounted upon the member 50, the flange 59 thereof being seated against the shoulder 52, thereby overlapping the upper portion of the crests 51 and the said plate 58 is furthermore formed with rectangular openings 62, each of which is arranged over a pocket 54 and constitutes means whereby air can be supplied to said pockets 54 and from the pockets into the furnace.

The reference character 63 denotes the top plate of the bosh element and which is formed of a series of segment-shaped abutting sections and each of the latter is provided at its inner edge with a depending flange 64 which overlaps the flange 61. The top plate 63 is mounted upon the flange 61 and is formed with depending spaced supports 65, which engage the plate 58. The supports 65 are positioned inwardly with respect to the outer edge of the plate 63 and the latter upon its upper face has formed integral therewith, a vertical rib 66. The outer portion of the plate 63 is cut away to provide openings 67 for supplying air to the air chamber 26. The top plate 63 extends to the shell 48.

Air supplied to the chamber 55 will pass between the supports 65, into the chamber 68 formed by the supports 65, top plate 63 and plates 58, 60 and from there will be discharged through the openings 62 into the pockets 54.

In the furnace construction illustrated in Figs. 1, 10 and 13, a base is employed, but it is not illustrated in Figs. 1 and 10, but shown in Fig. 13 and is designated by the reference character 69. It will be pointed out that in the construction shown in Figs. 1, 10 and 13, that an air cooled bosh is set up which not only constitutes a bosh lining, but also a support for the shell lining above the lower twyer and that furthermore the elements of the lower twyer as well as the elements of the upper twyer are air cooled.

It is furthermore obvious that in view of the foregoing construction and arrangement of parts, that an overhang air cooled bosh element is positioned directly over the lower twyers and that air supplied to the upper twyers can be regulated.

What I claim is:—

1. A cupola furnace comprising an air cooled bosh element including a bottom plate constituting the top of a hollow lower twyer construction for the furnace and further provided with means forming an imperforate lining overhanging said lower twyer construction.

2. A cupola furnace comprising a lower twyer construction including a bottom plate and spaced blocks mounted thereon to provide lower twyer openings, an air cooled bosh element mounted upon the top of said blocks and having its bottom constituting the top of the lower twyer construction, said element including means forming an imperforate lining overhanging said twyer openings, and means for supplying air to said lower twyer construction and element.

3. A cupola furnace comprising an upper twyer construction, a lower twyer construction, and an air cooled bosh element interposed between and communicating with said twyer constructions.

4. A cupola furnace comprising an upper twyer construction, a lower twyer construction, and an air cooled bosh element interposed between and communicating with said twyer constructions, said air cooled bosh element forming a part of said lower twyer construction.

5. A cupola furnace comprising an inclined lower twyer construction, and an air cooled bosh element forming the top of said construction.

6. A cupola furnace comprising an inclined lower twyer construction, and an air cooled bosh element communicating with the interior of said construction and further forming a part of said construction.

7. A cupola furnace comprising an inclined lower twyer construction and an air cooled bosh element mounted upon and forming the top of said lower twyer construction, said lower twyer construction including twyer openings, and said element provided with an overhang to protect said openings.

8. A cupola furnace comprising means to constitute an annular air chamber, means for supplying air thereto, and a series of casings supported by and detachably connected to said means and constituting upper twyers, and means for cutting off the supply of air to said chamber.

9. A cupola furnace comprising a lower twyer construction having twyer openings, a hollow bosh element mounted upon and forming the top of said lower twyer construction and provided with means to overhang said openings, means constituting an imperforate lining for establishing communication between said twyer construction and said hollow element, and means for supplying air to said twyer construction.

10. A cupola furnace comprising a lower twyer construction having twyer openings, a hollow bosh element mounted upon and forming the top of said lower twyer construction and provided with means constituting an imperforate lining to overhang said openings, means for establishing communication between said twyer construction and said hollow element, means for supplying air to said twyer construction, means mounted upon said element to provide an air chamber, means for controlling communication between said element and said chamber, and casings detachably connected to said means and supported thereby to provide upper twyers, said casings independently communicating with said chamber.

11. In a cupola furnace, a hollow bosh element consisting of an upper and a lower plate, said lower plate having an upwardly and inwardly extending inclined portion upon which said upper plate is mounted, supporting means between the upper and the lower plates, said inclined portion constituting an overhang for the lower twyer openings of the furnace, and means for supplying air to said element.

12. A cupola furnace comprising a hollow bosh element having its overhang imperforate, means associated with said element to provide a lower twyer construction, means for supplying air to said lower twyer construction, and means for establishing communication between said element and lower twyer construction whereby a portion of the air supplied to said construction will be supplied to said element to cool the same.

13. A cupola furnace comprising a hollow bosh element, means associated with said element to provide a lower twyer construction, means for supplying air to said lower twyer construction, and means for establishing communication between said elements and lower twyer construction whereby the air supplied to said construction will be supplied to said element to cool the same, said element including an imperforate overhanging portion to protect the twyer openings of the lower twyer construction.

14. A cupola furnace comprising an upper twyer construction, a hollow bosh element arranged below said upper twyer construction and having that portion constituting a part of the lining of the furnace, imperforate means associated with said element to provide a lower twyer construction, and a common means for supplying air to said twyer construction and said element.

15. A cupola furnace comprising an upper twyer construction, a hollow bosh element arranged below said upper twyer construction, means associated with said element to provide a lower twyer construction, means for supplying air to said twyer construction and said element, and means for controlling a supply of air from the lower twyer construction to the upper twyer construction.

16. A cupola furnace comprising an upper twyer construction, a hollow bosh element arranged below said upper twyer construction, means associated with said element to provide a lower twyer construction, and means for supplying air to said lower twyer construction and said element, means for conducting air from said lower twyer construction to said upper twyer construction, and means for controlling the passage of air from the lower twyer construction to the upper twyer construction, said bosh element provided with an overhanging portion to protect said lower twyer construction.

17. A cupola furnace comprising a hollow bosh element including a flattened top, a bottom inclining toward the interior of the furnace, an inclined imperforate wall extending upwardly and outwardly at an inclination and engaging said top, said wall overhanging the lower twyer of the furnace, and air inlet openings for said bosh element.

18. A cupola furnace comprising an upper twyer construction, a lower twyer construction, a bosh element interposed between said twyer constructions, means for supplying air to said lower twyer construction, means for conducting a portion of the air supplied to said lower twyer construction to the said upper twyer construction, and means for controlling the supply of air from said lower twyer construction to said upper twyer construction.

19. A cupola furnace comprising an air cooled bosh element having an inclined bottom forming the top of the lower twyer construction of the furnace, an inclined lower twyer construction associated with the inclined bottom of said bosh element and communicating with the interior of the bosh element, and means for supplying air to said lower twyer construction whereby said bosh element will be cooled.

20. A cupola furnace comprising an air cooled bosh element including a bottom plate constituting the top of a hollow lower twyer construction for the furnace, said element provided with means for establishing communication there between and the lower twyer construction of the furnace for the supply of air to said element, and said element further provided with means forming an imperforate lining overhanging the lower twyer construction of the furnace.

21. In a cupola furnace, a hollow bosh element consisting of a flat upper and an inclined lower plate, said upper plate having its inner edge provided with a depending flange, said lower plate having an upwardly and inwardly inclined portion and upon said upper plate is mounted said flange positioned against the top of said upwardly extending inclined portion, supporting means between the upper and lower plates, said upwardly and inwardly extending inclined portion constituting an overhang for the lower twyer openings of the furnace.

22. In a cupola furnace, a hollow bosh element consisting of a flat upper and an inclined lower plate, said upper plate having its inner edge provided with a depending flange, said lower plate having an upwardly and inwardly inclined portion and upon said upper plate is mounted said flange positioned against the top of said upwardly extending inclined portion, supporting means between the upper and lower plates, said upwardly and inwardly extending inclined portion constituting an overhang for the lower twyer openings of the furnace, and means for supplying air to said element.

23. A cupola furnace comprising a hollow bosh element constituting an annular air chamber, one wall of said chamber extending upwardly and inwardly at an inclination and overhanging the lower twyer construction of a furnace, said inner wall being imperforate throughout, a lower twyer construction connected with said air chamber, means for supplying air to said construction, whereby a portion of air will be conducted into said chamber.

24. A cupola furnace comprising a hollow bosh element having that wall thereof forming a part of the furnace lining imperforate and overhanging the lower twyer construction, an upper twyer construction, a lower twyer construction, and means whereby air is supplied to said constructions and element.

25. A cupola furnace comprising a hollow bosh element having that wall thereof forming a part of the furnace lining imperforate and overhanging the lower twyer construction, an upper twyer construction, a lower twyer construction, means whereby air is supplied to said constructions and element, and means whereby the supply of air to the upper twyer construction is controlled.

In testimony whereof I affix my signature in the presence of two witnesses.

MICHAEL ZIPPLER, Jr.

Witnesses:
NICHOLAS L. BOGAN,
MAX H. SROLOVITZ.